(No Model.)
J. B. PELTON.
GRAIN WEIGHING AND BAGGING MACHINE.
No. 283,018. Patented Aug. 14, 1883.
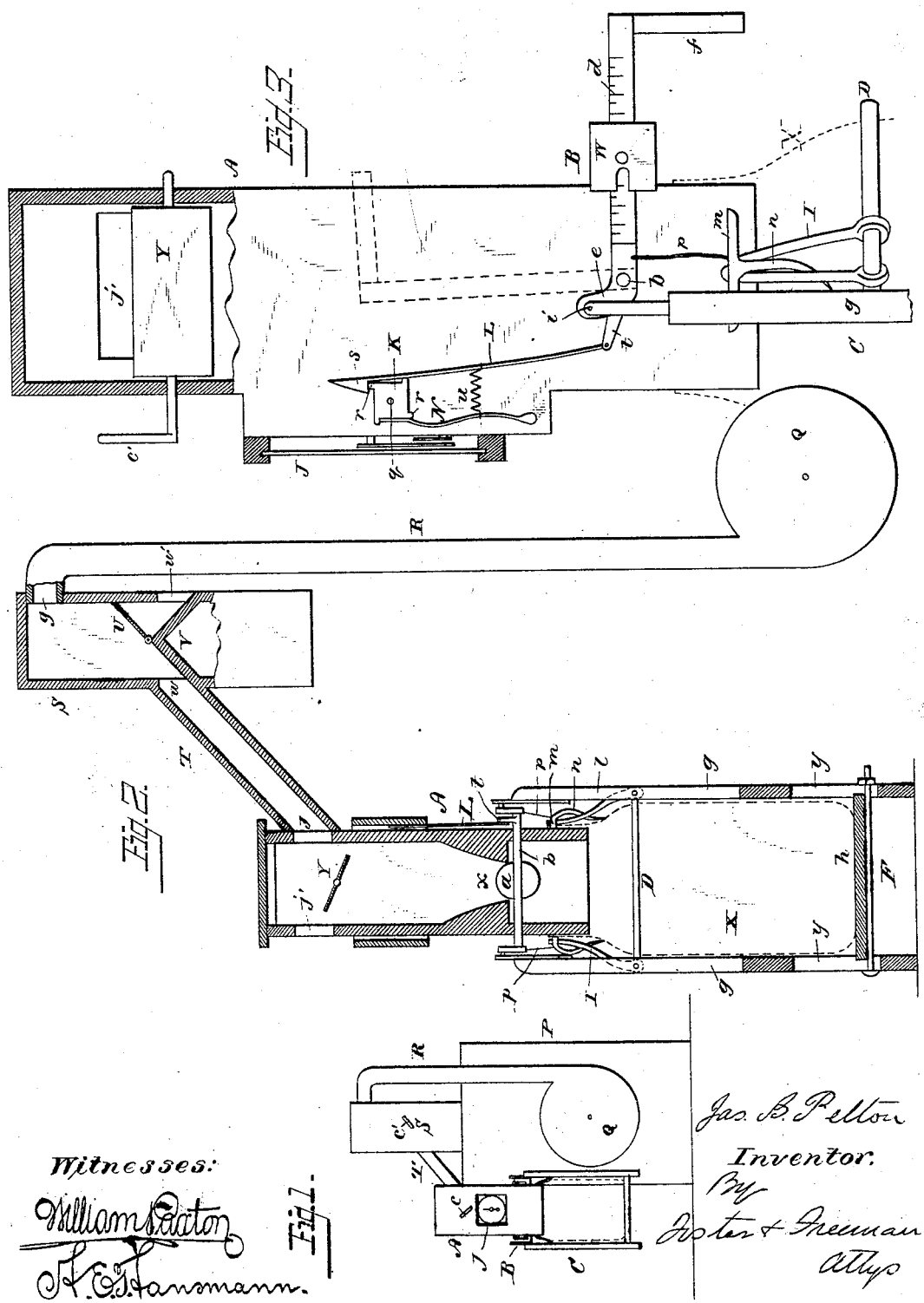

UNITED STATES PATENT OFFICE.

JAMES B. PELTON, OF MOUNT PLEASANT, MARYLAND, ASSIGNOR OF ONE-HALF TO DAWSON E. HAMMOND, OF SAME PLACE.

GRAIN WEIGHING AND BAGGING MACHINE.

SPECIFICATION forming part of Letters Patent No. 283,018, dated August 14, 1883.

Application filed May 15, 1883. (No model.)

*To all whom it may concern:*

Be it known that I, JAMES B. PELTON, of Mount Pleasant, Frederick county, Maryland, have invented certain Improvements in Grain Weighing and Bagging Machines, of which the following is a specification.

My invention consists in certain improvements in grain weighing and bagging mechanism, fully described hereinafter, whereby I am enabled to take the grain directly from the cleaning-machine, weigh and bag it, cutting off the supply of grain automatically as each portion is weighed, and registering each weighing operation.

In the drawings, Figure 1 is an exterior elevation, showing my improved apparatus as applied to a grain-cleaning machine. Fig. 2 is a sectional elevation of the apparatus enlarged, and Fig. 3 is a side view in part section of part of weighing and registering devices.

The measuring apparatus consists, essentially, of a receiver or casing, A, a scale, B, and a bag-holder, C.

The receiver A is a rectangular case, having a contracted opening, $x$, at or near the lower end, provided with a valve, $a$, secured to a shaft, $b$, which turns in the casing, and is connected with the scales, so that as the latter is moved by the weight of the grain the valve A will be moved to close the opening $x$. Each scale-beam $d$ is graduated, as shown, and is provided with an upturned inner end, $e$, and is connected at the outer end to the opposite beam by a yoke, $f$, which limits the movement of the scale after the beams assume a vertical position. (Shown by dotted lines, Fig. 3.) The yoke $f$, being attached to the end of the scale-beam and bent at right angles thereto, as shown, allows the scale-beam to move up to a vertical position, thereby giving more movement to the beam, and further allows the parts to be securely and closely held in a compact form for transportation. From each end $e$ projects a pin, $i$, to which is pivoted the upper end of a standard, $g$, of the bag-holder C, the platform $h$ of the latter being adjustable upon the standard, and secured movably thereon by a transverse bolt, F, passing through slots $y$ in the standard, and provided with a head at one end and a nut at the other, as shown.

To the standard is connected a yoke, D, to which at each side is hung a clamp consisting of a forked arm, I, swinging upon the yoke and a T-shaped blade, $m$, pivoted to the upper end of the arm, the finger $n$ on the said blade extending between the forks of the arm I, and thereby limiting the vibration of the latter.

The bag X to be filled is placed upon the platform, with its mouth inclosing the lower extended end of the case A. The scale-beams are then turned to a horizontal position, and the clamps I are brought against the sides of the bag, which is thus clasped between the blades $m$ and the sides of the case, so that it will maintain its position while the grain passes through the opening $x$. As soon as the weight of grain in the bag counterbalances that of the weights W upon the scale-beams the bag-holder will descend, turn the scale to the position shown in dotted lines, Fig. 3, and thereby move the valves $a$ so as to close the opening $x$. Owing to the ends $e$ of the beams being bent up as shown, the standard $g$ is carried rapidly toward the shaft $b$ as the scale-beams descend, the leverage thereby increasing, so as to accelerate the motion and insure the rapid and complete closing of the opening $x$.

Each clamp I is connected to the adjacent beams $d$ by means of a cord, $p$, so that as the scale is turned to a vertical position the cords will be drawn upward, lifting the clamps and releasing the end of the bag to permit it to be readily withdrawn from the end of the casing, the clamps being at the same time retained in such position as not to interfere with the application of another bag to the end of the casing in the same manner as the first.

I do not limit myself to the precise construction of scale herein set forth, as it may be varied to some extent without affecting the result set forth. Other connections may also be made between the scale and clamping devices, so as to clamp the bag when the valve is open, and release it when the valve is closed.

It is desirable to keep a record of the number of bags weighed, for which purpose I secure to the case A a counter mechanism, J, provided with suitable pointers operated by the intermittent turning of the shaft $q$. To effect this turning with regularity and certainty I provide the end of the shaft with a polygonal block, K, having a tooth, r, at each angle, with which engages a shoulder, s, of a rod, L, connected to an arm, t, upon the shaft b. An arm, N, pivoted at the lower end, is connected by a spring, u, to the arm L, so that both arms are brought against the sides of the block K, but will yield as the latter is turned. As the shaft b is turned upon each descent of the bag-holder, the arm L will be drawn down, and the shoulder s, catching upon one of the projections r, will revolve the block K until the next flat side thereof is brought opposite the arm N, which will then be pressed by the spring tightly against the block and prevent the further revolution thereof, as the arm L ascends when the shaft b is rocked in the opposite direction.

The device constructed as above described may be used in connection with apparatus variously constructed to supply the grain to the casing A, said apparatus being either stationary or portable. The device is, however, especially adapted for use as a portable apparatus to be employed in grain-cleaning-machines, in which case the arrangement adopted is that substantially shown in Fig. 1, in which P indicates a winnowing-machine of any suitable construction; Q, a revolving elevator—such, for instance, as that described in the Letters Patent granted to me March 27, 1883, No. 274,817. R is the delivery-chute leading from said elevator, and which may in some cases connect directly with the casing A.

In order to adapt the connection to be made at either side of the machine, and to further cleanse the grain, I interpose between the chute R and the casing A a receiver, S, and conduit T. The receiver S is a casing having a port, v, at or near the top, which communicates with the chute R, and near the bottom at opposite sides are ports w w' opposite a gable-shaped bottom, V, to the apex of which is pivoted a valve, U, which may be turned to one side or the other by means of a handle, c', so as to direct the grain which passes into the casing S to either port w w'. By this arrangement, if by any chance the valve in the casing A should remain closed and the grain accumulate in the casing to an undesirable amount, the valve U may be shifted to direct the grain through the port w' to another casing and bagging device at the other side of the machine; or the surplus grain may fall down upon the machine and pass again to the elevator until the obstruction in the casing A is removed, thereby preventing the grain filling the casing A and passing out the port j, and becoming mixed with the waste.

The conduit T is arranged between the delivery-port of the receiver and a port, j, at one side of the casing A, and there is a similar port, j', at the opposite side of the casing. Between the ports is a plate, Y, which may be so adjusted as to temporarily retard the flow of the grain and deflect the air-currents through the opening j', the lighter particles being thereby carried through the latter opening, while the grain falls into the casing. The plate Y may be adjusted by means of an external handle, c, so as to insure the discharge of the lighter particles without throwing out the grain.

By combining the elevating device with the grain-cleaning machine, I am enabled to raise the grain as fast as it passes from said machine to such an elevated position that it will flow readily to the casings of the weighing apparatus, from which it may be quickly measured off and bagged. By this means I am enabled to apply the apparatus as a portable machine to various forms of grain-cleaning devices.

Without limiting myself to the precise construction and arrangement of parts shown, and without disclaiming the features not specifically claimed hereinafter, as the same may constitute the subjects of separate applications for Letters Patent,

I claim—

1. The combination, with the grain-cleaning machine and bagging apparatus having a casing, A, of the receiver S at the top of the machine, having two or more ports serving as a receptacle for the grain, and as a source from which it may be directed to the casing of the bagging apparatus, substantially as set forth.

2. The combination of the grain-weighing apparatus having a casing, A, an elevator, Q, a receiver, S, elevated above the casing A, and having ports w w' and deflecting-valve U, and conduits R T, substantially as specified.

3. The receiving-casing A, provided with a valve at the lower end, with ports j j' in the opposite walls, and with a deflecting-plate, Y, substantially as set forth.

4. The combination of the grain-cleaning machine, elevator, and elevated receiver connecting with the elevator-shaft, and provided with ports and valve, and adapted to direct the grain to either side, and bagging and weighing apparatus at one side, to which the grain is directed, substantially as set forth.

5. The combination, with the casing A, of a shaft carrying a valve, a, a scale connected to the valve having beams with upturned ends e, a bag-holder hung to said ends e, and clamps connected to the scale-beams, as specified.

6. The combination, with the casing A, shaft b, and valve a, of the scale-beams d d, yoke f, and bag-holder C, as set forth.

7. The combination of a casing, scale, bag-holder, and clamps, and connections with the bag-holder, whereby the clamps are automatically released as the holder descends, substantially as specified.

In testimony whereof I have signed my name to this specification in the presence of two subscribing witnesses.

JAMES B. PELTON.

Witnesses:
H. A. HALL,
A. E. T. HANSMANN.